United States Patent Office 3,501,338
Patented Mar. 17, 1970

3,501,338
ALUMINUM PLATING PROCESS
Norman E. Matzek, Midland, Donald F. Musinski, Bay City, and Herbert C. Roehrs, Beaverton, Mich., assignors to The Dow Chemical Company, Midland, Mich., a corporation of Delaware
No Drawing. Filed Feb. 15, 1967, Ser. No. 617,764
Int. Cl. C23c 13/02, 17/00
U.S. Cl. 117—107.2      3 Claims

ABSTRACT OF THE DISCLOSURE

This invention relates to a process for coating a substrate with metallic aluminum by contacting such substrate with α-aluminum hydride which has been treated with ethanol. Upon heating, the treated α-aluminum hydride will decompose to produce a film of metallic aluminum. Such decomposition will take place below the decomposition temperature of α-aluminum hydride which has not been so treated.

Background of the invention

It is known that metallic aluminum may be plated from solvated aluminum hydrides and aluminum chlorohydrides by contacting these materials with a substrate at or above their decomposition temperature. Such processes usually require a relatively high temperature, however, and therefore cannot be used to plate substrates which are adversely affected by such temperatures. It would be highly desirable, therefore, to have a process whereby aluminum plating could be conducted at lower temperatures.

Summary of the invention

This invention relates to a non-electrolytic aluminum plating process and more particularly relates to a method for plating aluminum onto various substrates at relatively low temperatures from unsolvated α-aluminum hydride.

An object of this invention, therefore, is to provide a new process for plating aluminum onto a substrate. A further object is to provide a relatively low temperature process which permits the plating of aluminum onto a variety of substrates. These and other objects and advantages of the present process will become apparent from a reading of the following detailed description.

It has now been discovered that unsolvated α-aluminum hydried may be treated with ethanol and the treated α-aluminum hydride may then be thermally decomposed to produce a metallic aluminum plate. The treatment of α-aluminum hydride with ethyl alcohol permits the decomposition of such treated α-aluminum hydride to form a uniform adherent plate or coating of metallic aluminum, usually in the form of a bright plate, on substantially any substrate at a relatively low temperature and therefore provides the art with a process for plating aluminum onto various substrates at temperatures below the usual decomposition temperature of α-aluminum hydride.

Brief description of preferred embodiments

By the term "α-aluminum hydride or alpha-aluminum hydride" as used herein, is meant the solid substantially non-solvated form of aluminum hydride having a density of about 1.47 grams per cubic centimeter, which has a unique X-ray diffraction as follows:

| d | I/I. | d | I/I. |
|---|---|---|---|
| 5.6 | 100 | 1.44 | 5 |
| 3.28 | 60 | 1.41 | 12 |
| 3.21 | 10 | 1.395 | 5 |
| 2.79 | 60 | 1.281 | 6 |
| 2.29 | 12 | 1.271 | 2 |
| 2.12 | 50 | 1.144 | 5 |
| 1.855 | 3 | 1.123 | 0.8 |
| 1.77 | 3 | 1.090 | 0.8 |
| 1.635 | 7 | 1.060 | 2 |
| 1.61 | 8 | 1.045 | 0.8 |
| 1.60 | 8 | 1.015 | 3 |
| 1.57 | 3 | 1.004 | 0.8 |
| 1.54 | 2 | | | and an infrared spectrum having significant absorption maxima at 640 cm.$^{-1}$, 680 cm.$^{-1}$, 870 cm.$^{-1}$, 955 cm.$^{-1}$, 1020 cm.$^{-1}$, 1650 cm.$^{-1}$ and 1760 cm.$^{-1}$. This material is insoluble or sparingly soluble in diethyl ether but is soluble in tetrahydrofuran.

This material may be prepared by dissolving aluminum hydride in an ether solvent, preferably in the presence of a complex metal hydride such as mixtures of lithium aluminum hydride and lithium borohydride and heating the ether solution under pressure at a temperature of from about 50 to about 85° C. for a period of time sufficient to crystallize the non-solvated α-aluminum hydride.

Substantially any normally solid material is suitable as a substrate herein. For example, metals such as iron, brass and copper, polymers such as polyolefins, polyamides, polymeric fluorocarbons, epoxy resins, polyurethanes and the like, glass, paper, cloth, carbon and graphite, wood, ceramics and the like are all plated with aluminum by the process of this invention. The nature of the surface being plated determines to a large extent the brightness of the aluminum plate. In general a smooth, non-porous surface such as commonly found on metals, glass and some polymers, produces a brighter plate than a relatively porous surface such as those commonly found on paper or cloth.

As the decomposition adjuvant herein, ethanol is the only material found to significantly reduce the temperature at which α-aluminum hydride will decompose to plate metallic aluminum on a substrate. It is thought that the ethanol reacts in some manner with the α-aluminum hydride to form a less stable alkoxy derivative but the exact mechanism is not known and this invention is not limited thereby.

In order to achieve the lower decomposition temperature of the α-aluminum hydride and to produce a metallic aluminum plate therefrom, it is desirable to employ a proportion of from about 0.06 part by weight of $C_2H_5OH$/1 part by weight of α-aluminum hydride to about 1.3 parts by weight of $C_2H_5OH$/1 part by weight of α-aluminum hydride before the plating step. It is desirable that the ethanol and α-aluminum hydride be in intimate contact for a period of from about 0.5 hour to about 24 hours before heating the α-aluminum hydride in contact with the substrate to produce decomposition and plating. The step of contacting α-aluminum hydride with the ethanol is most conveniently conducted at or near room temperature but elevated temperatures may be employed if desired. When a higher temperature is employed, less contact time between the α-aluminum hydride and the ethanol is usually required.

Contact between the α-aluminum hydride and the ethanol adjuvant may be achieved in any suitable manner. For example, the α-aluminum hydride may be employed as a solid or a suspension in an inert liquid when mixed with the ethanol. Once contacted for the desired period of time, the mixture may be applied directly to the substrate and heated to produce decomposition and the formation of an aluminum plate or, alternatively, the treated α-aluminum hydride may be separated from the ethanol-containing mixture and applied either as a solid or suspension to the desired substrate. Heating of the treated α-aluminum hydride in contact with the substrate under either vacuum or atmospheric pressure will cause decomposition of the treated α-aluminum hydride and plating of metallic aluminum onto the substrate. Usually a temperature of between about 80° C. and about 150° C. is sufficient to produce such decomposition and plating. In general, the plating occurs more rapidly at the higher temperatures.

The following examples are provided to further illustrate the invention but are not to be construed as limiting to the scope thereof.

Example 1

A six gram sample of α-aluminum hydride was mixed with 150 ml. of a 0.1 weight percent solution of ethanol in diethyl ether and the mixture was stirred for 1.5 hours at room temperature. During this period gas was evolved from the mixture. The treated α-aluminum hydride was then removed from the mixture by filtration, washed with 500 ml. of diethyl ether and dried at room temperature. A portion of the treated α-aluminum hydride powder was contacted with a glass surface at 100° C. for 24 hours. A shiny aluminum mirror-like plate was formed on the glass surface.

As a control, a sample of untreated α-aluminum hydride was contacted with a glass surface at 100° C. for 24 hours but no aluminum plating occurred.

Example 2

In the manner of Example 1, a 1 gram sample of α-aluminum hydride was mixed with 100 ml. of a 2.0 weight percent solution of ethanol in diethyl ether. The mixture was stirred at room temperature for 45 minutes. At the end of this treatment period, the treated α-aluminum hydride was separated by filtration and dried under vacuum. Pieces of brass, copper and iron were then dusted with the treated α-aluminum hydride powder and the substrate was heated to 100° C. for 24 hours. At the end of this period, the brass, cooper and iron pieces were all plated with metallic aluminum.

We claim:
1. A process for plating substrates with metallic aluminum which comprises intimately contacting α-aluminum hydride with a sufficient quantity of ethanol to lower the decomposition temperature of said α-aluminum hydride, contacting the treated α-aluminum hydride with a substrate and heating the treated α-aluminum hydride to a temperature sufficient to produce the decomposition thereof.

2. The process according to claim 1 wherein the weight ratio of ethanol to α-aluminum hydride is between about 0.06/1 and 1.3/1, and wherein ethanol is contacted with the α-aluminum hydride for a period of from about 0.5 to about 24 hours prior to contact of the α-aluminum hydride with the substrate.

3. The process according to claim 2 wherein the substrate is a member selected from the group consisting of glass, cooper, iron and brass.

References Cited

UNITED STATES PATENTS

| | | | |
|---|---|---|---|
| 2,567,972 | 9/1951 | Schlesinger et al. | 23—14 |
| 2,804,397 | 8/1957 | Goodman | 117—65 |
| 2,847,328 | 8/1958 | Bulloff | 117—107.2 X |
| 2,880,115 | 3/1959 | Drummond | 117—107.2 X |

RALPH S. KENDALL, Primary Examiner

U.S. Cl. X.R.

106—1; 117—130, 160